United States Patent
Yasuda et al.

(10) Patent No.: US 6,525,446 B1
(45) Date of Patent: Feb. 25, 2003

(54) ELECTROSTATIC ACTUATOR DRIVING METHOD AND MECHANISM, USING RIGIDITY RETENTION AS A PARAMETER

(75) Inventors: Susumu Yasuda, Machida (JP); Takayuki Yagi, Yokohama (JP); Futoshi Hirose, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/592,560

(22) Filed: Jun. 12, 2000

(30) Foreign Application Priority Data

Jun. 14, 1999 (JP) .......................................... 11-167151

(51) Int. Cl.[7] .............................. H02N 1/00; H02N 1/06
(52) U.S. Cl. ........................ 310/309; 318/135; 318/116
(58) Field of Search .................... 310/12, 309; 318/135, 318/116

(56) References Cited

U.S. PATENT DOCUMENTS

| | | | |
|---|---|---|---|
| 5,055,731 A | * | 10/1991 | Nihei et al. .................. 310/309 |
| 5,187,399 A | * | 2/1993 | Carr et al. ............ 310/40 MM |
| 5,753,911 A | | 5/1998 | Yasuda et al. ............... 250/306 |

FOREIGN PATENT DOCUMENTS

| | | |
|---|---|---|
| JP | 63-95860 | 4/1988 |
| JP | 7-112354 | 4/1988 |
| JP | 6-261558 | 9/1994 |

* cited by examiner

*Primary Examiner*—Karl Tamai

(57) ABSTRACT

In a method of driving an electrostatic actuator which has a stator having driving electrodes in plural phases and a traveler moved along the stator by application of a driving voltage to the driving electrodes, the driving voltage applied to the driving electrodes is decided according to a voltage function employing as arguments a relative movement position of the traveler and/or a retention rigidity with which the traveler is retained at a standing position on the stator.

An electrostatic actuator mechanism comprises a stator having driving electrodes in plural phases, a traveler relatively moved along the stator, a voltage applying means for applying a driving voltage to the driving electrodes, and a voltage function means for deciding the driving voltage applied to the driving electrodes according to a voltage function employing as argument a relative movement position of the traveler and/or a retention rigidity with which the traveler is retained at the standing position on the stator.

8 Claims, 9 Drawing Sheets

ELECTROSTATIC ACTUATOR DRIVING METHOD AND MECHANISM, USING RIGIDITY RETENTION AS A PARAMETER

BACKGROUND OF THE INVENTION

1. Field of the Invention

The present invention relates to a mechanism and a method for driving an electrostatic actuator. In particular, the present invention relates to a mechanism for driving an electrostatic actuator which enables precise positioning and control of retention rigidity (ratio of positional restoration force to positional deviation) of the electrostatic actuator, and to a method for driving the electrostatic actuator.

2. Related Background Art

Figure 9:
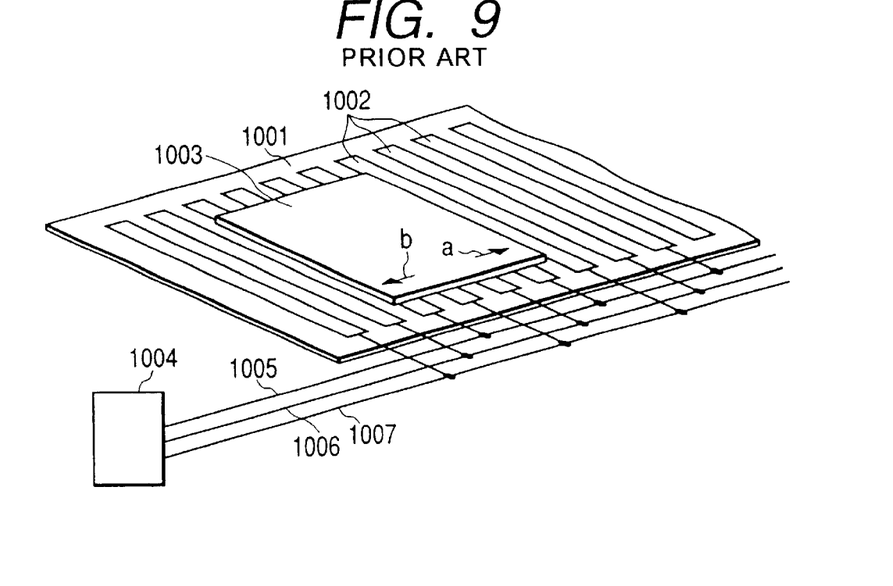
FIG. 9 is a drawing for explaining an electrostatic actuator of a first example of prior arts.
Figure 10A:
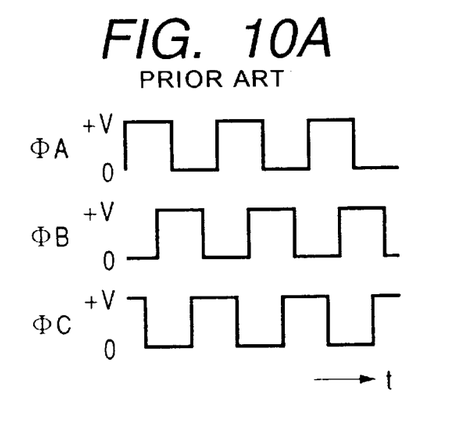
FIGS. 10A and 10B are drawings for explaining voltage application patterns for the electrostatic actuator of the first example of prior arts.
Figure 10B:
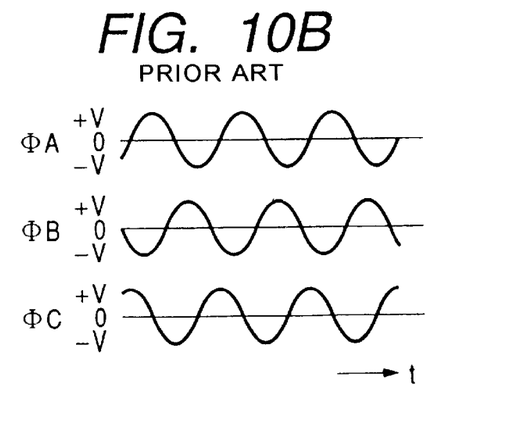

Various types of electrostatic actuators are disclosed in recent years. The electrostatic actuator is advantageous in (1) its high efficiency without causing loss, and (2) its simple structure constituted only of electrodes, being suitable for miniaturization. FIG. 9 shows an electrostatic actuator disclosed in Japanese Patent Publication No. 6-101938. In FIG. 9, stator 1001 comprises an insulative substrate, and driving electrodes 1002 formed on the surface thereof. Traveler 1003 constituted of a dielectric material is held with a clearance by a holding means (not shown in the drawing) to be movable in the directions shown by arrow marks a and b in the drawing. Driving circuit 1004 applies a voltage to driving electrodes 1002 provided on the surface of stator 1001. Driving circuit 1004 outputs three phases of driving voltages: ΦA(1005), ΦB(1006), and ΦC(1007). Each of the phases is connected successively to driving electrodes 1002 as shown in FIG. 9. FIGS. 10A and 10B show the timing of voltage application by driving circuit 1004 to the electrodes. FIG. 10A shows application of pulse voltage of (0/+V) V of the respective phases (to the respective electrodes). FIG. 10B shows application of AC voltage of (+V/−V) V thereto. The application of the pulse voltage as the phases of ΦA(1005), ΦB(1006), and ΦC(1007) as shown in FIG. 10A generates an electric field moving in the direction of the arrow mark a (the abscissa t representing the time). The moving electric field induces electric charge in traveler 1003 to exert a driving force to traveler 1003 to follow the moving electric field with a lag. Similarly, the application of pulsed voltage exerts a driving force to the traveler 1003. To drive the traveler in the reverse direction (the arrow b direction), the phase order of the applied voltage is reversed. This reversal can be conducted by exchanging two of the three voltage-phases.

Figure 11:
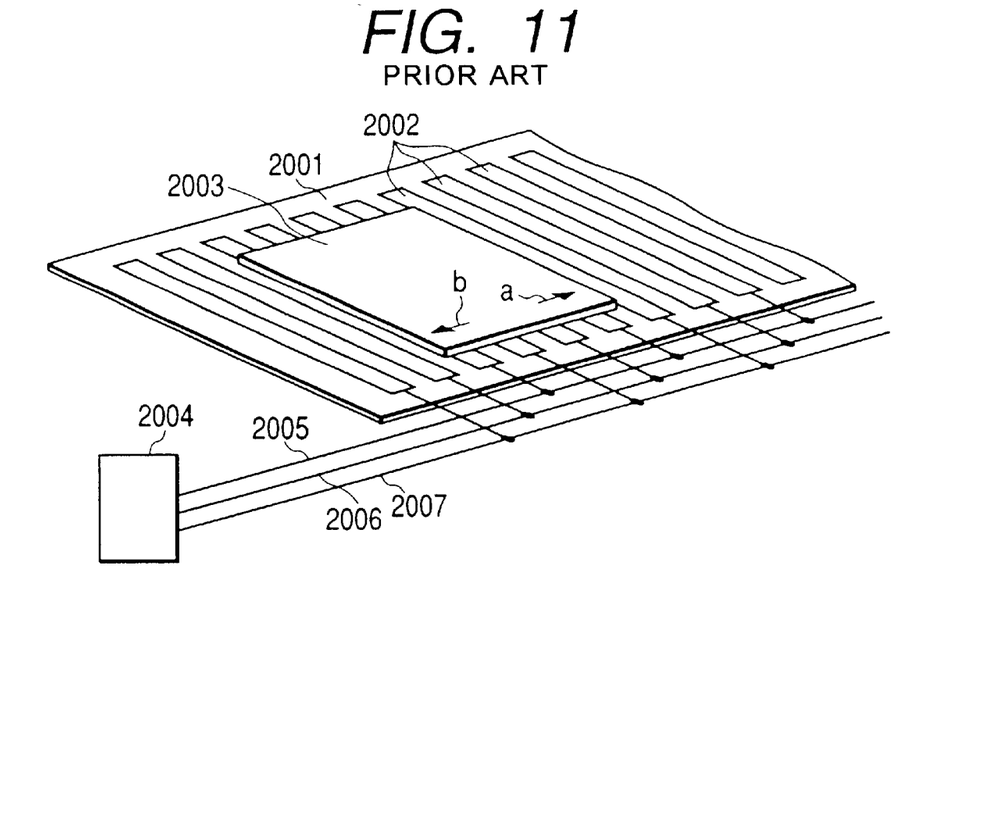
FIG. 11 is a drawing for explaining an electrostatic actuator of a second example of prior arts.
Figure 12:
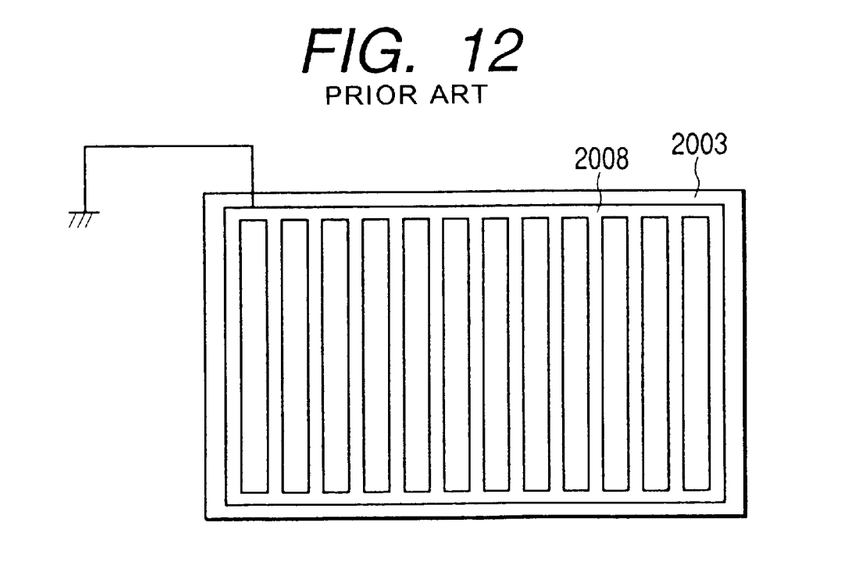
FIG. 12 is a drawing for explaining a traveler of the second example of prior arts.

FIG. 11 shows an electrostatic actuator disclosed in Japanese Patent Publication No. 7-112354. In FIG. 11, the parts 2001–2007 corresponds to the parts 1001–1007 in FIG. 9. FIG. 12 illustrates the traveler of the electrostatic actuator shown in FIG. 11. Traveler 2003 comprises driven electrodes 2008 which are arranged at regular intervals on the face confronting the stator and are kept at a fixed potential. This type of electrostatic actuator is driven by change of electrostatic capacity between the traveler and the stator, which is caused by displacement of the traveler. The voltage is applied to driving electrodes 2002 in such a pattern as shown in FIGS. 10A and 10B.

Figure 13:
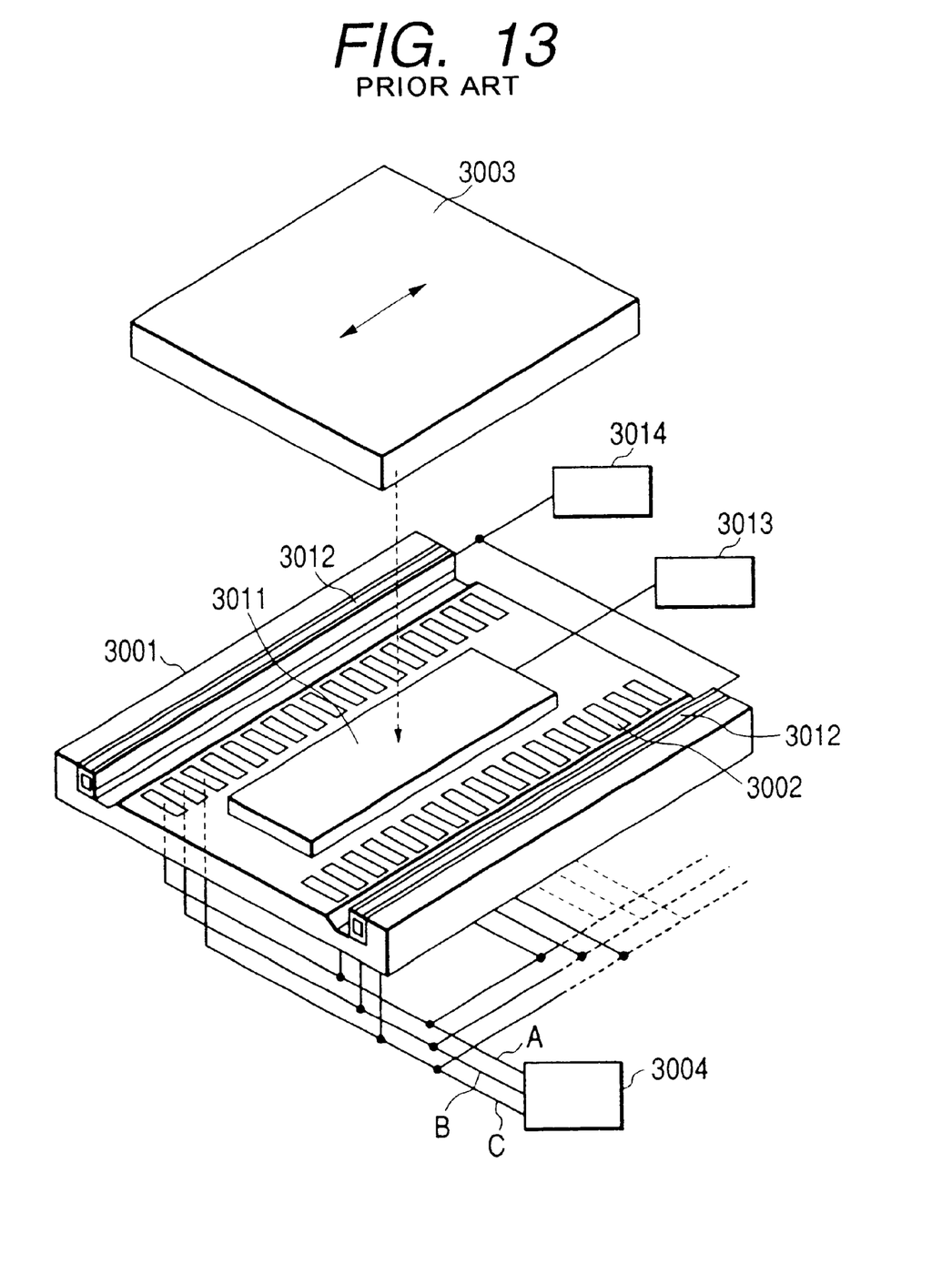
FIG. 13 is a drawing for explaining an electrostatic actuator of a third example of prior arts.

FIG. 13 shows an electrostatic actuator disclosed in Japanese Patent Application Laid-Open No. 6-261558, which floats or levitates the traveler above the stator by a squeeze film effect to remove the friction between the traveler and the stator. In FIG. 13, first piezo element 3011 is driven in accordance with the signal from first piezo element control circuit 3013, and second piezo element 3012 is driven in accordance with the signal from second piezo element control circuit 3014. In this electrostatic actuator, a squeeze film is formed between traveler 3003 and stator 3001 by driving first piezo element 3011 and second piezo element 3012 to support traveler 3003 by levitation without contact above stator 3001. Thereby, traveler 3003 is driven by application of a driving voltage to driving electrode 3002 in accordance with signals from electrostatic motor control circuit 3004 similarly as in the aforementioned electrostatic actuator.

However, problems below arise in precise positioning with an electrostatic actuator like those mentioned above. Firstly, in the electrostatic actuator which is driven stepwise by application of driving voltage in a waveform as shown in FIG. 10A, high resolution in positioning is not achievable, because the driving step depends on the pattern pitch of the driving electrode and the driving step cannot be made smaller than the pattern pitch, disadvantageously. On the other hand, in the electrostatic actuator which is driven by application of driving voltage in a A waveform as shown in FIG. 10B, a control parameter for the actuator is the frequency of driving voltage, namely the speed of actuation. Therefore, for precise positioning with this actuator, a feedback system with a position sensor of high resolution is necessary, which is generally expensive, resulting in high cost of the system. Further, the incorporation of the position sensor into the actuator makes difficult the miniaturization of the actuator. Furthermore, in a conventional electrostatic actuator, the standing position and retention rigidity κ of the traveler can not be set arbitrarily. In the present invention, the retention rigidity κ is a proportionality constant represented by the equation: $\kappa = F/\Delta x$ (where F is the restoring force to restore the traveler to the prescribed standing position, and $\Delta x$ is positional deviation of the traveler of the electrostatic actuator from the prescribed standing position). The retention rigidity K is desirably capable of being set arbitrarily since the optimum value thereof depends on the load and the driving conditions.

SUMMARY OF THE INVENTION

The present invention intends to provide a method of driving an electrostatic actuator which does not involve the aforementioned problems of conventional electrostatic actuator and can be provided at a low cost, can be miniaturized readily, and is capable of making the driving step pitch smaller than the pattern pitch of the driving electrode, and also to provide a mechanism of driving the electrostatic actuator.

The present invention intends also to provide a method of driving an electrostatic actuator which enables arbitrary setting of the retention rigidity of a positioned traveler, a mechanism of driving the electrostatic actuator, and an electrostatic actuator employing the method and the mechanism.

An embodiment of the method of driving an electrostatic actuator of the present invention which has a stator having driving electrodes in plural phases and a traveler relatively moved along the stator by application of a driving voltage to the driving electrodes, wherein the driving voltage applied to the driving electrodes is decided according to a voltage function employing as an argument a relative movement position of the traveler on the stator.

Another embodiment of the method of driving an electrostatic actuator of the present invention which has a stator having driving electrodes in plural phases and a traveler relatively moved along the stator by application of a driving voltage to the driving electrodes, wherein the driving voltage applied to the driving electrodes is decided according to a voltage function employing as an argument a retention rigidity with which the traveler is retained at a standing position on the stator.

A still another embodiment of the method of driving an electrostatic actuator of the present invention which has a stator having driving electrodes in plural phases and a traveler moved along the stator by application of a driving voltage to the driving electrodes, wherein the driving voltage applied to the driving electrodes is decided according to a voltage function employing as arguments a position of the traveler and a retention rigidity with which the traveler is retained at a standing position on the stator.

An embodiment of the electrostatic actuator mechanism of the present invention comprises a stator having driving electrodes in plural phases, a traveler relatively moved along the stator, a voltage applying means for applying a driving voltage to the driving electrodes, and a voltage function means for deciding the driving voltage applied to the driving electrodes according to a voltage function employing as an argument a relative movement position of the traveler on the stator.

Another embodiment of the electrostatic actuator mechanism of the present invention comprises a stator having driving electrodes in plural phases, a traveler relatively moved along the stator, a voltage applying means for applying a driving voltage to the driving electrodes, and a voltage function means for deciding the driving voltage applied to the driving electrodes according to a voltage function employing as an argument a retention rigidity with which the traveler is retained at a standing position on the stator.

A still another embodiment of the electrostatic actuator mechanism of the present invention comprises a stator having driving electrodes in plural phases, a traveler relatively moved along the stator, a voltage applying means for applying a driving voltage to the driving electrodes, and a voltage function means for deciding the driving voltage applied to the driving electrodes according to a voltage function employing as an argument a movement position of the traveler and a retention rigidity with which the traveler is retained at a standing position on the stator.

DESCRIPTION OF THE PREFERRED EMBODIMENTS

Figure 1:
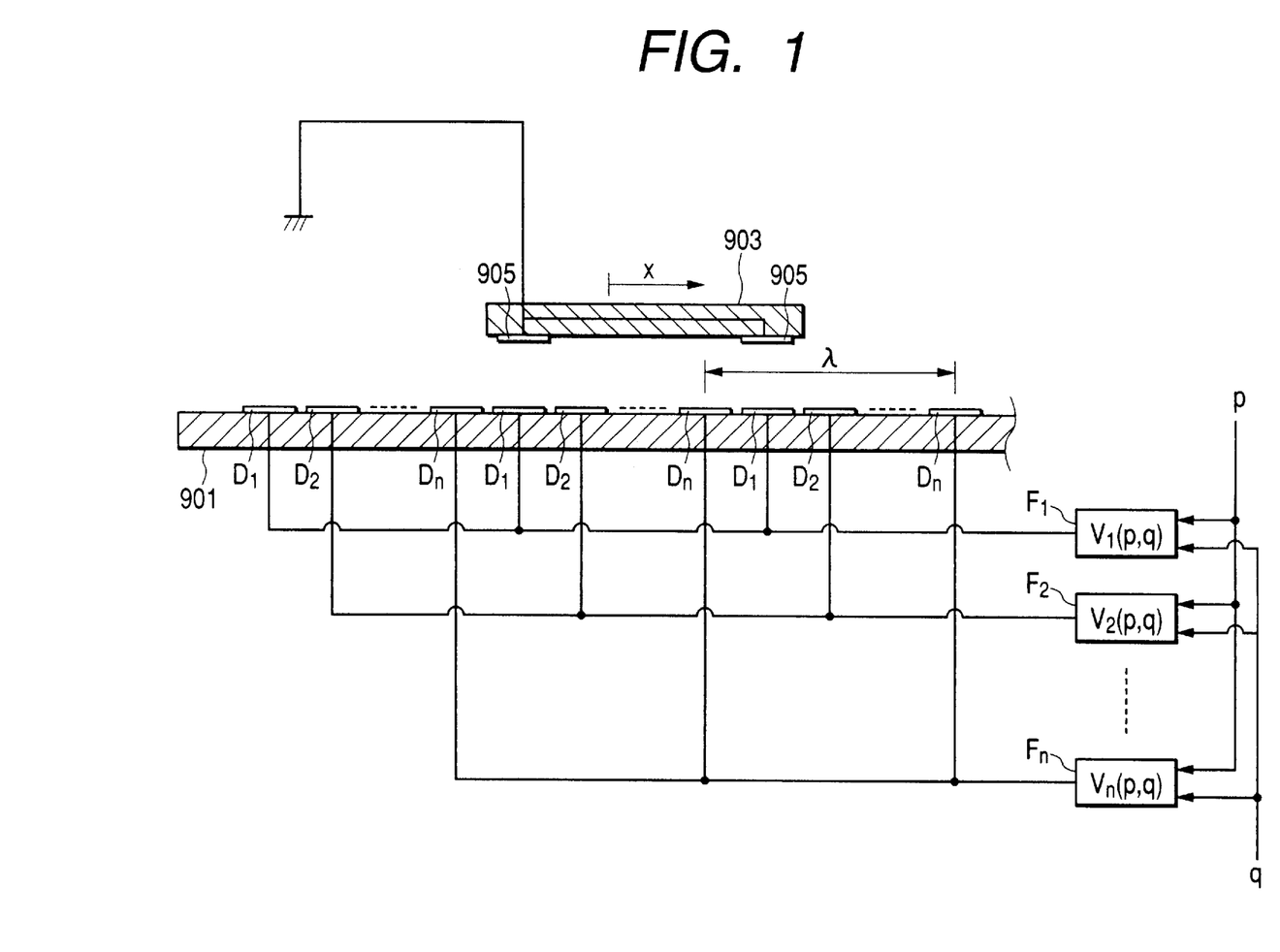
FIG. 1 is a drawing for explaining the principle of the present invention.

The principle of the electrostatic actuator driving mechanism of the present invention is described by reference to FIG. 1. In FIG. 1, driving electrodes $D_1$ to $D_n$ of n phases are arranged successively on stator 901 at regular intervals from the left to the right. The interval between the electrodes of the same phase is denoted by $\lambda$. On traveler 903, driven electrodes 905 are arranged at the interval of $\lambda$. Traveler 903 is supported to be movable along stator 901 in a lateral direction only in FIG. 1. The x axis is defined along the traveler movement direction. The position of the traveler is defined to be x=0, when driven electrode 905 is directly above driving electrode $D_1$. Applying voltage generation functions $F_1$ to $F_n$ generate voltages $V_1(p,q)$ to $V_n(p,q)$ to be applied respectively to driving electrodes $D_1$ to $D_n$ according to the position address p and the rigidity address q. The stable position of traveler 903 and the retention rigidity at the stable position depend on the voltage applied to driving electrodes $D_1$ to $D_n$.

Therefore, the traveler can be positioned with a resolution finer than the pitch of the driving electrodes by taking the movement position of traveler 903 as an argument in applying voltage generation functions $F_1$ to $F_n$ in the present invention. Further, the traveler can be stabilized also with a restoration force of a desired rigidity by taking a retention rigidity with which traveler 903 is retained at the standing position of traveler 903 as an argument in applying voltage generation functions $F_1$ to $F_n$ in the present invention. Furthermore, in the present invention the traveler can be stabilized by a restoring force of a desired rigidity, while conducting the positioning with a resolution finer than the driving electrode pitch, by taking as the arguments the position of traveler 903 and the retention rigidity with which the traveler is retained at the standing position.

The electrostatic capacity between driven electrodes 905 and driving electrodes $D_1$ to $D_n$ varies depending on position x of the traveler. The electrostatic capacities are represented herein by $C_1(x)$ to $C_n(x)$. Thereby, the electrostatic energy u(x,p,q) accumulated between driven electrodes 905 and driving electrodes $D_1$ to $D_n$, the force f(x,p,q) acting on driving electrodes 905 in the x direction, and the retention rigidity $\kappa(x,p,q)$ are given by the equations below.

$$u(x, p, q) = -\frac{1}{2}\sum_{k=1}^{n} C_k(x) V_k^2(p, q) \quad (1)$$

-continued $$f(x, p, q) = -\frac{\partial u}{\partial x} = \frac{1}{2}\sum_{k=1}^{n}\frac{dC_k(x)}{dx}V_k^2(p, q) \qquad (2)$$

$$\kappa(x, p, q) = -\frac{\partial f}{\partial x} = -\frac{1}{2}\sum_{k=1}^{n}\frac{d^2C_k(x)}{dx^2}V_k^2(p, q) \qquad (3)$$

At $x=x_g$ and $\kappa=\kappa_g$, the traveler is stabilized under the conditions below:

$$\left.\begin{array}{l} f(x_g, p, q) = 0 \\ \kappa(x_g, p, q) = \kappa_g > 0 \end{array}\right\} \qquad (4)$$

The applying voltage generation functions $F_1$ to $F_n$ may be set to satisfy the mathematical relations (4) at the target position $X_g$. Rigidity $\kappa_g$ should be positive. Thereby the traveler is stabilized with a resolution finer than the pitch of the driving electrodes at the target position $X_g$ by giving a position address p.

Further in the present invention, the applying voltage generation functions $F_1$ to $F_n$ may be set to satisfy the mathematical relations (4) at a target position $x_g$ and an objective rigidity $\kappa_g$. Thereby the traveler is stabilized with a restoring force of an objective rigidity $\kappa_g$ by giving a rigidity address q. Additionally, by giving a position address p thereto, the traveler can be stabilized at an target position $X_g$ with a resolution finer than the pitch of the driving electrodes. With the control as above, the positioning in the electrostatic actuator can be conducted without being limited the resolution by the pitch of the electrode pattern, and the retention rigidity at the stable position can be set arbitrarily.

A three-phase electrostatic actuator is considered below as a simple example. Assuming that the driving electrodes are arranged endlessly at regular intervals, the electrostatic capacity is a periodic function having a period of $\lambda$. This electrostatic capacity is shown by the equations below:

$$\left.\begin{array}{l} C_1(x) = C_0 + C_a\cos(2\pi x/\lambda) \\ C_2(x) = C_0 + C_a\cos(2\pi x/\lambda - 2\pi/3) \\ C_3(x) = C_0 + C_a\cos(2\pi x/\lambda - 4\pi/3) \end{array}\right\} \qquad (5)$$

where $C_o$ and $C_a$ are constants. When $V_1(p,q)$, $V_2(p,q)$, and $V_3(p,q)$ are given as below:

$$\left.\begin{array}{l} V_1(p, q) = q \cdot \sin(2\pi p) \\ V_2(p, q) = q \cdot \sin(2\pi p - 2\pi/3) \\ V_3(p, q) = q \cdot \sin(2\pi p - 4\pi/3) \end{array}\right\} \qquad (6)$$

then the equations (1), (2) and (3) are modified as below:

$$u(x, p) = -\frac{3C_a}{8}q^2\cos\left(4\pi p - \frac{2\pi x}{\lambda}\right) - \frac{3C_0V_0^2}{4} \qquad (7)$$

$$f(x, p) = \frac{3\pi C_a}{4d}q^2\sin\left(4\pi p - \frac{2\pi x}{\lambda}\right) \qquad (8)$$

$$\kappa(x, p) = \frac{6\pi^2 C_a}{4d\lambda}q^2\cos\left(4\pi p - \frac{2\pi x}{\lambda}\right) \qquad (9)$$

From the mathematical relations (4), the traveler will be stabilized at $$x = 2\lambda p - m\lambda \quad (m=0,+1+2,\ldots) \qquad (10)$$

Therefore, the stabilization positions exist at regular intervals of $\lambda$, and x is a linear function of the parameter p. Therefore, the positioning can be controlled by selecting p as the control input.

The rigidity $\kappa$ of the restoring force f at the stabilization point is represented by the equation below:

$$\kappa = \frac{6\pi^2 C_a}{4d\lambda}q^2 \qquad (11)$$

Therefore, the retention rigidity will be controlled by selecting q as the control input.

The maximum value $f_{max}$ of the restoring force is represented by the equation below:

$$f_{max} = \frac{3\pi C_2}{4d}q^2 \qquad (12)$$

Therefore, the driving is controlled to keep the sum of the inertial force, the frictional force and so forth acting on the traveler so as not to exceed the $f_{max}$ value during the driving.

Since, in a practical actuator, the electrostatic capacity cannot be derived readily, the value of $V_k(p,q)$ is derived by numerical calculation or by experiment with a practical device. In the present invention, the electrostatic capacity is determined by numerical calculation. $C_k(x_j)$ is calculated numerically by moving the traveler stepwise to the positions of $$x_j = dj \quad (j=0,+1,+2,\ldots) \qquad (13)$$

where d is the minimum step distance for the positioning. The numerical calculation can be conducted by a usual finite element method, or a usual boundary element method. Therefrom, derivatives with respect to x are obtained as below:

$$\left.\begin{array}{l} \left.\dfrac{dC_k}{dx}\right|_{x=x_n} = \dfrac{C_k(X_{n+1}) - C_k(X_{n-1})}{2d} \\ \left.\dfrac{d^2 C_k}{dx^2}\right|_{x=x_n} = \dfrac{C_k(X_{n+1}) - 2C_k(X_n) + C_k(X_{n-1})}{d^2} \end{array}\right\} \qquad (14)$$

From these, $V_k(p,q)$ are decided to satisfy the mathematical relations 4. The combination is preferably selected to lower the maximum value of $V_k$ for decreasing the load on the power source.

In another method, the applying voltage generation function may be decided by actually measuring the $C_k(x_j)$ value by a capacitance tester with the traveler moved stepwise by means of a positioning stage or a like mechansim, in a similar manner as in the numerical calculation.

Next, a method of deciding the voltage function in the present invention is explained by reference to an example of a three-phase electrostatic actuator. $V_1$, $V_2$, and $V_3$ are represented by a two parameters, r and s, as below:

$$\left.\begin{array}{l} V_1(r, s) = s \cdot \sin(2\pi r) \\ V_2(r, s) = s \cdot \sin(2\pi r - 2\pi/3) \\ V_3(r, s) = s \cdot \sin(2\pi r - 4\pi/3) \end{array}\right\} \qquad (15)$$

The values of $V_1$, $V_2$, and $V_3$ are obtained for target positions x of the traveler by the following procedure. Firstly, the traveler is moved to a target position, with the parameter s kept constant and the parameter r varied, by measuring the position x of the traveler by a position sensor.

Thereby, are obtained the values of $V_1$, $V_2$, and $V_3$ for one target position x. This operation is repeated for all of the target positions, whereby the applying voltage generating function can be decided. After the applying voltage generation functions are decided, the open-loop control can be conducted without using the position sensor.

Another method of deciding the voltage function in the present invention is explained by reference to an example of a three-phase electrostatic actuator. $V_1$, $V_2$, and $V_3$ are represented by equations (15) above. The values of $V_1$, $V_2$, and $V_3$ are obtained for an objective rigidity θ of the traveler by the procedure below. Firstly, the angular frequency ω is measured around the stable position of the traveler with the parameter r kept constant and the parameter s varied by measuring the position x of the traveller by a position sensor. Then, the parameter s is adjusted to obtain the angular frequency ω of $\sqrt{(k/m)}$ (where m is the mass of the traveler). The vibration around the stable position can be caused by applying to the driving electrodes impulsive driving signals in superposition. Thereby, are obtained the values of $V_1$, $V_2$, and $V_3$ for one objective rigidity θ. This operation is repeated for all of the objective rigidities, whereby the applying voltage generating function can be decided.

A still another method of deciding the voltage function in the present invention is explained by reference to an example of a three-phase electrostatic actuator. $V_1$, $V_2$, and $V_3$ are represented by equations (15) above. The values of $V_1$, $V_2$, and $V_3$ are obtained for a target position x of the traveler and the objective rigidity K by the procedure below. Firstly, (1) the traveler is moved to the target position with the parameter s kept constant and the parameter r varied by measuring the position x of the traveler by a position sensor. (2) At that state, impulsive driving signals are applied to the driving electrodes in superposition to make the traveler vibrate from side to side around the stable position. Then, the parameter s is adjusted with the parameter r kept constant to obtain the angular frequency ω of $\sqrt{(k/m)}$ (where m is the mass of the traveler). If the stable position deviates is excess of the allowable range (approximately an objective position resolution), the procedure is repeated from the step (1) above. If not, the procedure comes to an end. Thereby, are obtained the values of $V_1$, $V_2$, and $V_3$ for one target position x and one objective rigidity κ. This operation is repeated for all of the target positions and the objective rigidities, whereby the applying voltage generating function can be determined.

The above operations may be conducted manually, but is preferably conducted automatically by computer control.

The present invention is explained by reference to examples.

EXAMPLE 1

Figure 8:
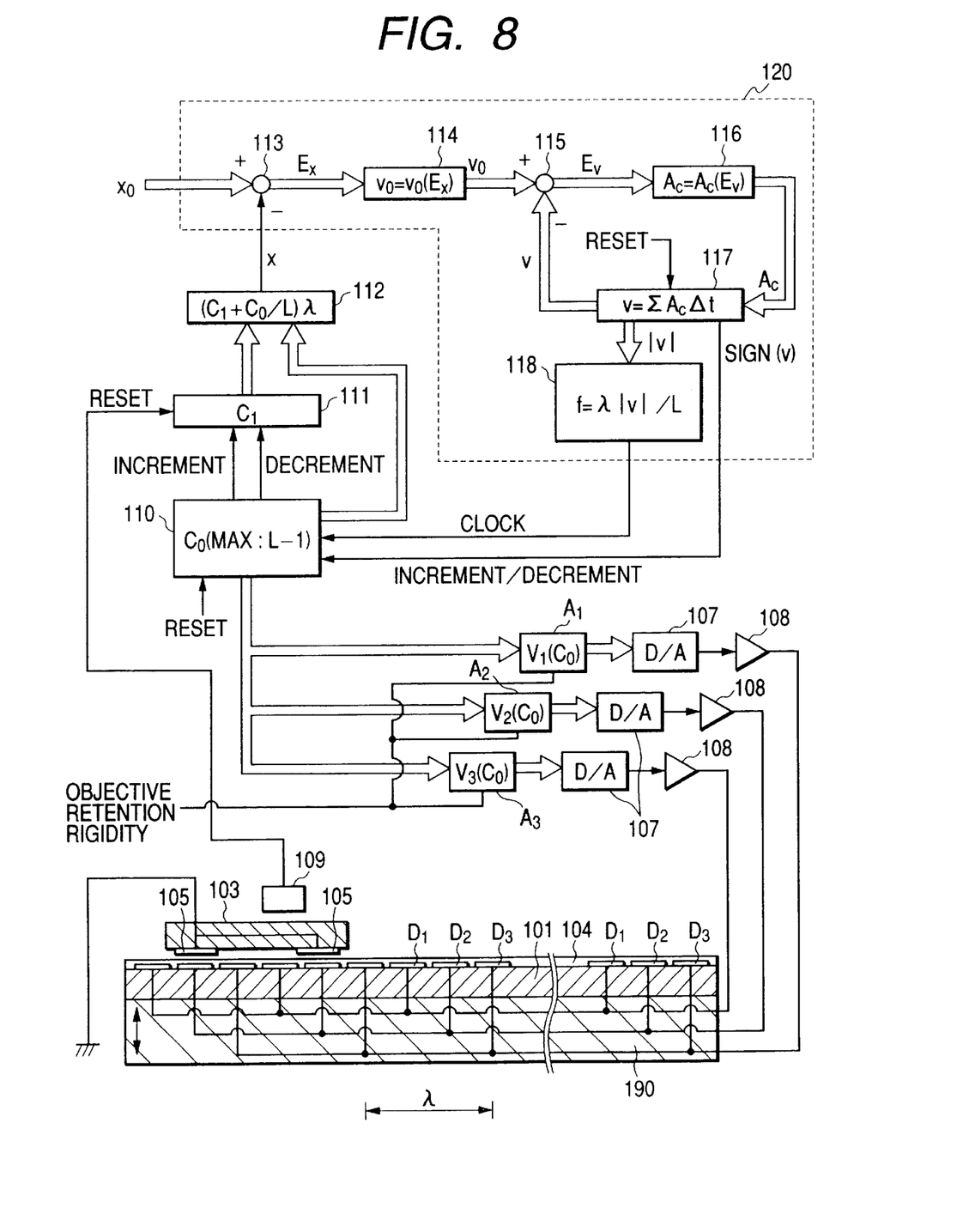
FIG. 8. is a drawing for explaining the electrostatic actuator and the controller in Example 1 of the present invention.

FIG. 8 illustrates Example 1 schematically. In the electrostatic actuator in this Example, traveler 103 is levitated by a squeeze film, and is driven in a lateral direction in the drawing. Three-phase driving electrodes $D_1$ to $D_3$ are provided on stator 101 made of a glass substrate, and the surfaces of the driving electrodes are covered with insulative thin film 104. The electrodes are arranged at intervals λ between the same kind of electrodes. Traveler 103 made of glass is placed above stator 101. Driven electrodes 105 are formed on traveler 103 on the face confronting the stator 101. Stator 101 is connected at the bottom face with vibrator 190. Vibrator 190 reciprocates stator 101 a vertical direction in the drawing to form a squeeze film between stator 101 and traveler 103, thereby allowing traveler to levitate from stator 101.

Fine movement counter 110 is capable of conducting increment and decrement with the maximum value of L−1 (L minus 1). The indication of fine movement counter 110 is represented by $C_o$. In this Example, the minimum movement resolution becomes λ/L. Coarse movement counter 111 constructed to give increment as the digit increases and to give decrement as the digit decreases. The indication of coarse movement counter 111 is represented by $C_1$. In this case, the increase of the count of the coarse movement counter by 1 causes movement of the traveler by λ. Coarse movement counter 111 is constituted to be reset by the signal from reference position sensor 109. Reference position sensor 109 need not be of high accuracy, but should be capable of detecting the position within a detection range of ±λ/2.

Figure 2A:
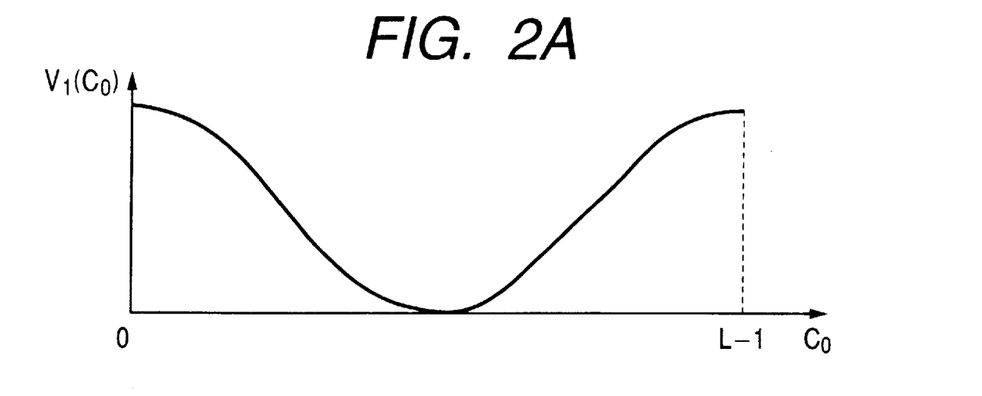
FIGS. 2A, 2B, and 2C are graphs for explaining the applied voltage generation function of Example 1 of the present invention.
Figure 2B:
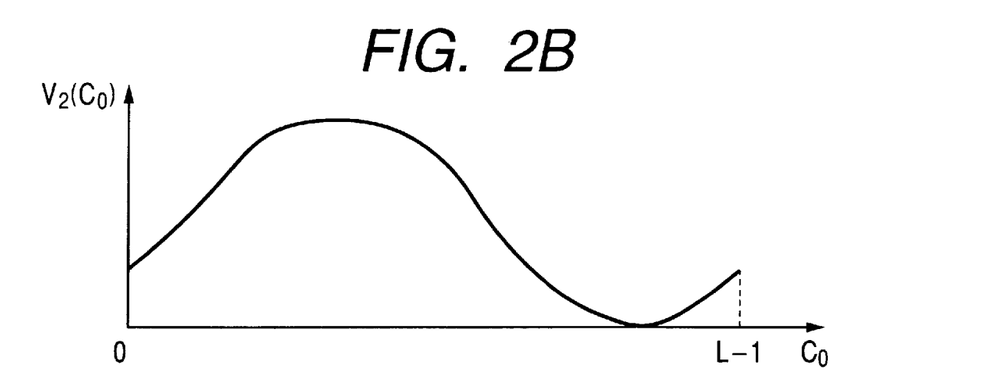
Figure 2C:
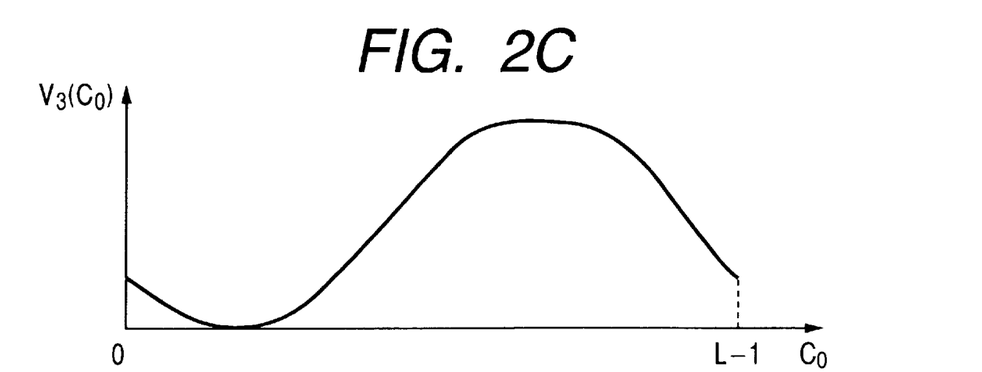

The indication $C_o$ of fine movement counter 110 is inputted into applying voltage generation functions $A_1$ to $A_3$ to be converted to applying voltages $V_1(C_o)$ to $V_3(C_o)$, which is applied through D/A converter 107 and high-voltage amplifier 108 to three-phase driving electrodes $D_1$ to $D_3$. The applying voltage generation functions $A_1$ to $A_3$ are set to advance the stable position of the traveler by λ/L for increase by 1 of $C_o$ value of fine movement counter 110. FIGS. 2A, 2B, and 2C show the relations between the applying voltage generation functions $A_1$ to $A_3$ and the indication $C_o$ of fine movement counter 110. These functions are respectively a periodic function shifted by 120° successively. The applying voltage generation functions $A_1$ to $A_3$ are constituted to change depending on the objective retention rigidity. The functions may be obtained by numerical calculation, or may be decided experimentally. Product-summation device 112 calculates the position x of the traveler from the indication $C_o$ of fine movement counter 110 and the indication $C_1$ of coarse movement counter 111 according to the equation:

$$x=(C_1+C_o/L)\lambda \qquad (16)$$

Controller 120 controls fine movement counter 110 according to the actual position x and the target position $x_o$. The operation of the control is explained below in detail. Subtraction device 113 obtains the positional error Ex by subtracting the target position $x_o$ from the actual position x. Objective velocity function 114 obtains objective velocity $v_o$ from the allowable maximum deceleration α and the maximum velocity $v_{max}$. For example:

$$v_o(E_x)=\text{Min}(\sqrt{2\alpha E_x}, v_{max}) \qquad (17)$$

Figure 3:
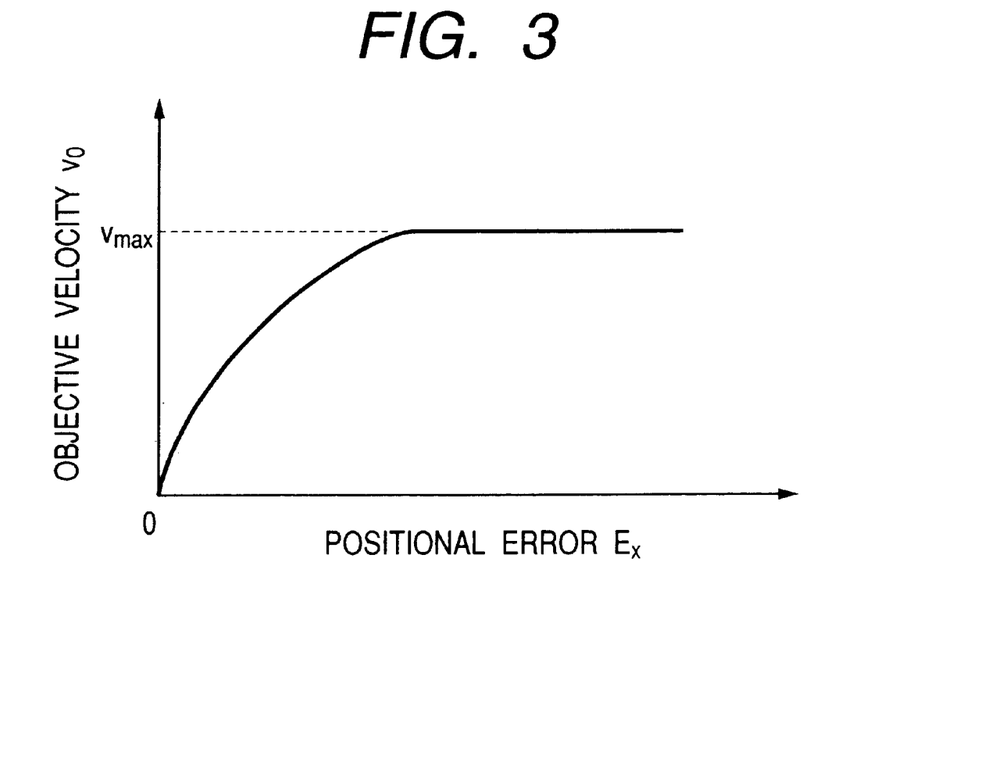
FIG. 3 is a graph for explaining the relation between the positional error $E_x$ and the objective velocity $v_o$ in Example 1 of the present invention.

FIG. 3 shows the relation between the positional error $E_x$ and the objective velocity $v_o$. The above function "Min" gives the minimum value of the arguments. Subtraction device 115 subtracts the actual velocity v from objective velocity $v_o$ to calculate the velocity error $E_v$.

Figure 4:
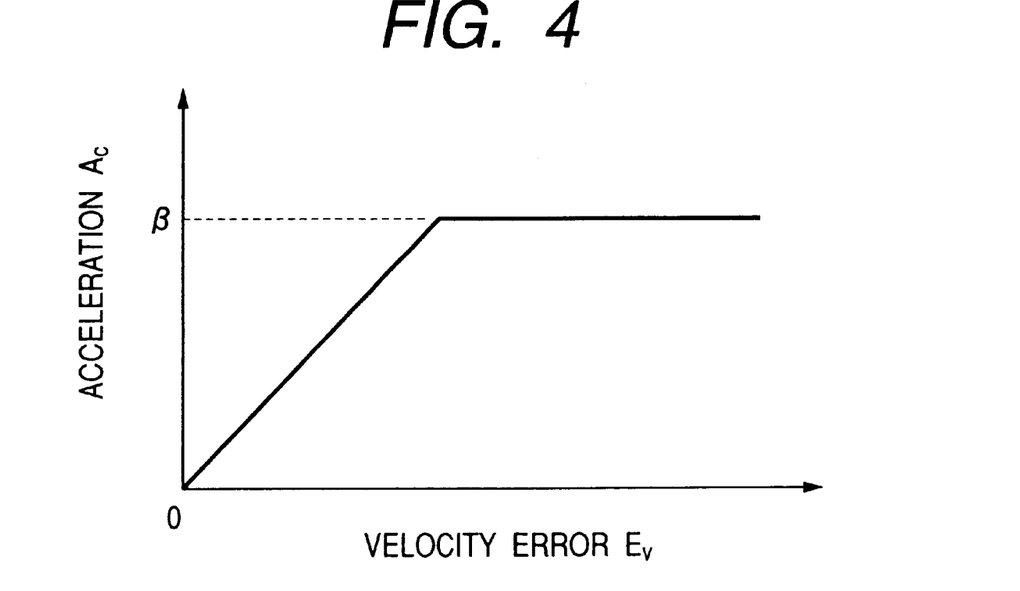
FIG. 4 is a graph for explaining the relation between the velocity error E, and the rate of acceleration $A_c$ in Example 1 of the present invention.

Acceleration function 116 causes acceleration Ac to decrease the velocity error E, based on the allowable maximum acceleration β. For example, $$A_c(E_v)=\text{Min}(G_v E_v, \beta) \qquad (18)$$

where $G_v$ is velocity gain. FIG. 4 shows the relation between the velocity error $E_v$ and acceleration $A_c$. Integration device 117 integrates the acceleration $A_c$ to calculate the velocity v. This value of velocity v is fed back to subtraction device 115. Variable frequency oscillator 118 generates oscillation frequency f below:

$$f = \frac{\lambda}{L}|v| \qquad (19)$$

Figure 5A:
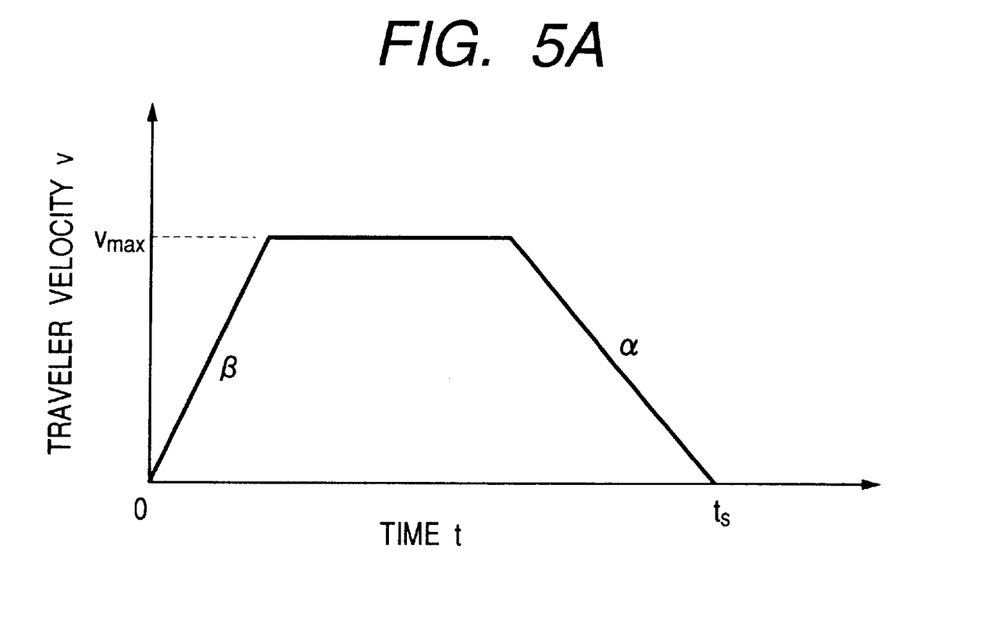
FIG. 5A is a graph for explaining the change of the velocity of the traveler with time in Example 1 of the present invention.
Figure 5B:
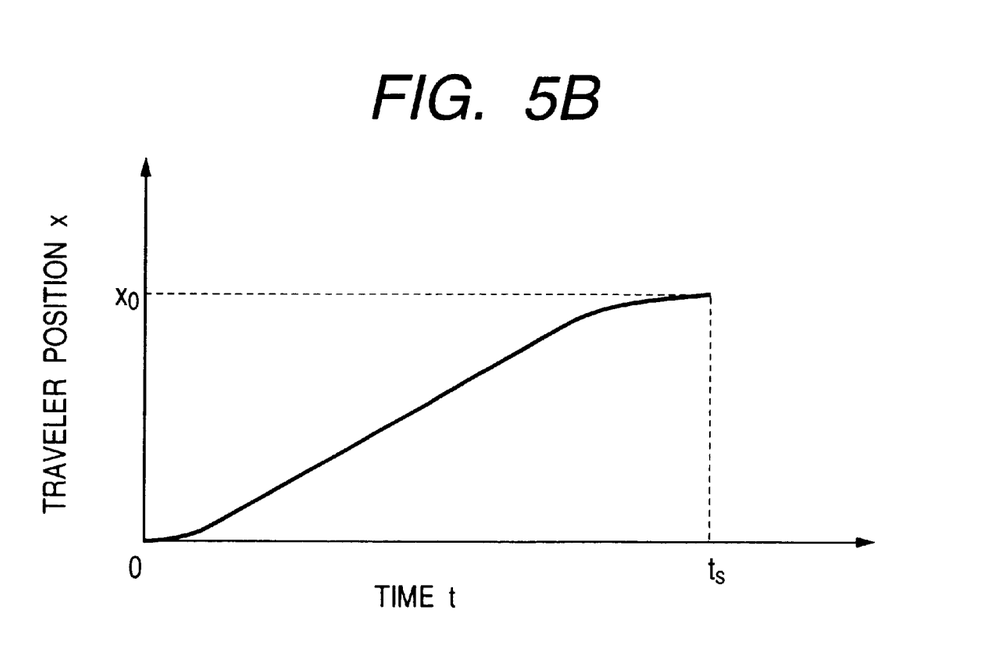
FIG. 5B is a graph for explaining the change of the position of the traveler with time in Example 1 of the present invention.

The output of the variable frequency oscillator is introduced to fine movement counter 110. The direction of increment/decrement of fine movement counter 110 is controlled by the sign of v. Thereby, fine movement counter 110 is controlled according to the output v of integration device 117 to drive the traveller at the velocity v. FIG. 5A shows the change of velocity v with time, and FIG. 5B shows the change of position x of the traveler with time. As shown in FIGS. 5A and 5B, the traveler is accelerated at acceleration β up to the maximum velocity $v_{max}$, driven at a constant velocity $v_{max}$, and thereafter decelerated at deceleration α down to 0 to stop at the target position $x_o$.

As described above, the present invention enables positional control with resolution finer than driving electrode pitch without using a precise position sensor which is expensive and bulky. Thereby the present invention provides an inexpensive electrostatic actuator for precise positioning. Since no sensor is used in the present invention, the electrostatic actuator for precise positioning can be made at a lower cost. The electrostatic actuator can be designed to set arbitrarily the retention rigidity at the stabilization position.

EXAMPLE 2

Figure 6:
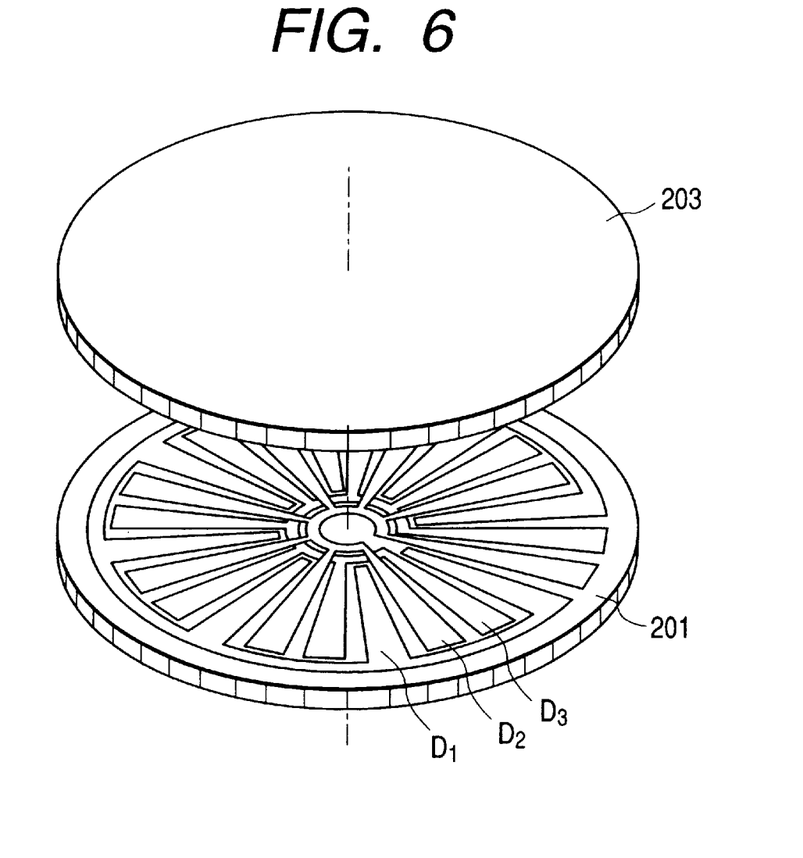
FIG. 6 is a drawing for explaining the electrostatic rotary actuator in Example 2 of the present invention.
Figure 7A:
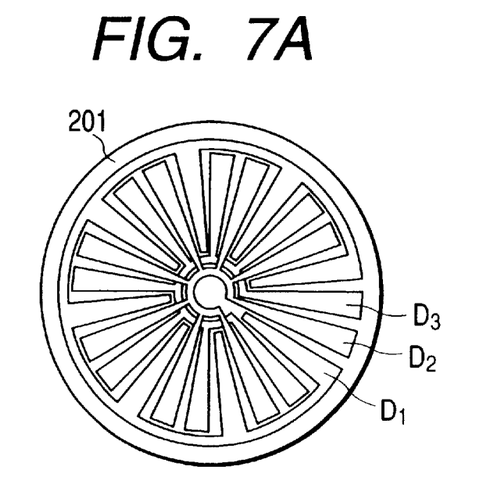
FIG. 7A shows the stator in Example 2 of the present invention.
Figure 7B:
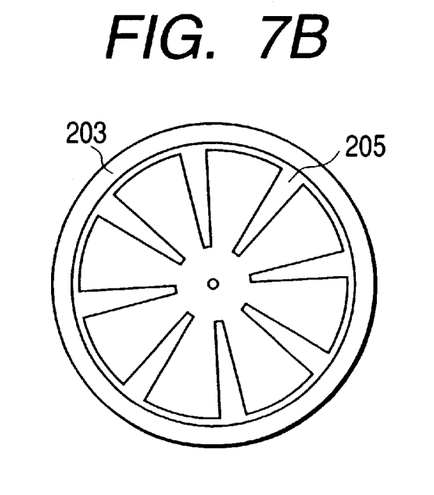
FIG. 7B shows the rotor in Example 2 of the present invention.

FIG. 6 shows perspectively a rotary type electrostatic actuator used in Example 2. Above stator 201, a rotor 203 is supported rotatably. FIGS. 7A and 7B are plan views of stator 201 and rotor 203. On stator 201, three-phase driving electrodes $D_1$ to $D_3$ are provided to which voltages are applied separately and independently. On rotor 203, driven electrodes 205 are provided and are kept at zero potential.

The rotary type electrostatic actuator of this example can be turned by an arbitrary angle without employing a high-precision rotary encoder by driving it by a similar way as in Example 1. The step of the turn is not restricted by the shape of the electrodes. The retention rigidity is also controllable. Naturally, the electrostatic actuator driving apparatus of the present invention is applicable not only to the above electrostatic actuators but to other types of electrostatic actuators requiring plural phases of driving voltage.

As described above, the present invention makes it possible to make smaller the driving step pitch of electrostatic actuator than the pattern pitch of the driving electrodes without employing an expensive precise position sensor. Thereby the present invention provides an inexpensive electrostatic actuator mechanism for precise positioning. Since no sensor is used in the mechanism of the present invention, the electrostatic actuator driving mechanism can be miniaturized. According to the present invention, the electrostatic actuator can be designed to set arbitrarily the retention rigidity at the intended standing position.

What is claimed is:

1. A method of driving an electrostatic actuator which has a stator driving electrodes in plural phases and a traveler relatively moved along the stator by application of a driving voltage to the driving electrodes, where the driving voltage applied to the driving electrodes is decided according to a voltage function employing as an argument a relative movement position of the traveler on the stator, and wherein the voltage function is obtained by a procedure comprising steps of determining an electrostatic capacity between the traveler and the driving electrode, obtaining a first derivative and a second derivative of the electrostatic capacity with respect to the position of the traveler, and setting driving voltages to satisfy the relations:

$$0 = \frac{1}{2}\sum_{k=1}^{n}\frac{dC_k}{dx}V_k^2$$

$$0 > \sum_{k=1}^{n}\frac{d^2C_k}{dx^2}V_k^2$$

where $V_k$ is a driving voltage of the k-th phase, x is the position of the traveler relative to the stator, n is a number of phases of the driving electrodes, and $C_k$ is an electrostatic capacity between the driving electrode of the k-th phase and the traveler.

2. The method of driving an electrostatic actuator according to claim 1, wherein the step of determining the electrostatic capacity between the traveler and the driving electrode comprises steps of constructing a calculation model for calculating electric field between the traveler and the driving electrode, and conducting the calculation of the electric field of the electric field calculation model.

3. The method of driving an electrostatic actuator according to claim 1, wherein the step of determining the electrostatic capacity between the traveler and the driving electrode comprises steps of setting the position of the traveler at a prescribed position, and measuring the electrostatic capacity between the traveler and the driving electrode.

4. A method of driving an electrostatic actuator which has a stator having driving electrodes in plural phases and a traveler relatively moved along the stator by application of a driving voltage to the driving electrodes, wherein the driving voltage applied to the driving electrodes is decided according to a voltage function employing as an argument a retention rigidity with which the traveler is retained at a standing position on the stator;

wherein the voltage function is decided by a procedure comprising steps of measuring an electrostatic capacity between the traveler and the driving electrode, obtaining a first derivative function and a second derivative function of the electrostatic capacity with respect to the position of the traveler, and setting driving voltages to satisfy the relations:

$$0 = \frac{1}{2}\sum_{k=1}^{n}\frac{dC_k}{dx}V_k^2$$

$$\kappa = -\frac{1}{2}\sum_{k=1}^{n}\frac{d^2C_k}{dx^2}V_k^2$$

where $V_k$ is a driving voltage of the k-th phase, x is the position of the traveler relative to the stator, κ is retention rigidity for retaining the traveler at a standing position, n is a number of phases of the driving electrodes, and $C_k$ is an electrostatic capacity between the driving electrode of the k-th phase and the traveler.

5. The method of driving an electrostatic actuator according to claim 4, wherein the step of determining the electrostatic capacity between the traveler and the driving electrode comprises steps of constructing calculation model for calculating electric field between the traveler and the driving electrode, and conducting the calculation of the electric field of the electric field calculation model.

6. The method of driving an electrostatic actuator according to claim 4, wherein the step of determining the electrostatic capacity between the traveler and the driving electrode comprises steps of setting the position of the traveler at a prescribed position, and measuring the electrostatic capacity between the traveler and the driving electrode.

7. A method of driving an electrostatic actuator which has a stator having driving electrodes in plural phases and a traveler relatively moved along the stator by application of a driving voltage to the driving electrodes, wherein the driving voltage applied to the driving electrodes is decided according to a voltage function employing as an argument a retention rigidity with which the traveler is retained at a standing position on the stator;

wherein the voltage function is decided by a procedure comprising steps of applying the driving voltage to the driving electrode, applying impulsive driving signals to the driving electrodes, measuring an angular frequency $\omega$ at a stable position of the traveler, and obtaining retention rigidity $\kappa$ from the equation $$\omega=\sqrt{(\kappa/m)}$$

where m is the mass of the traveler.

8. A method of driving an electrostatic actuator which has a stator having driving electrodes in plural phases and a traveler moved along the stator by application of a driving voltage to the driving electrodes, wherein the driving voltage applied to the driving electrodes is decided according to a voltage function employing as arguments a relative movement position of the traveler and a retention rigidity with which the traveler is retained at a standing position on the stator;

wherein the voltage function is decided by a procedure comprising steps of applying a driving voltage to the driving electrode, measuring a stable position of the traveler, applying impulsive driving signals to the driving electrodes, measuring an angular frequency $\omega$ at a stable position of the traveler, and obtaining retention rigidity $\kappa$ from the equation $$\omega=\sqrt{(\kappa/m)}$$

where m is the mass of the traveler.

* * * * *

UNITED STATES PATENT AND TRADEMARK OFFICE
CERTIFICATE OF CORRECTION

PATENT NO.    : 6,525,446 B1
DATED         : February 25, 2003
INVENTOR(S)   : Susumu Yasuda et al.

It is certified that error appears in the above-identified patent and that said Letters Patent is hereby corrected as shown below:

Column 1,
Line 52, "corresponds" should read -- correspond --.

Column 2,
Line 21, "a A" should read -- a --.

Column 5,
Line 29, "an" should read -- a --;
Line 32, "without" should read -- without the resolution --;
Line 33, "the resolution," should be deleted; and
Line 67, "(m=0,+1+2, . . .)" should read -- (m=0,±1,±2, . . .) --.

Column 6,
Line 30, "(j=0,+1,+2, . . .)" should read -- (j=0,±1,±2, . . .) --.

Column 7,
Line 29, "K" should read -- κ --;
Line 38, "is excess" should read -- in excess --; and
Line 47, "is" should read -- are --.

Signed and Sealed this

Sixth Day of April, 2004

JON W. DUDAS
*Acting Director of the United States Patent and Trademark Office*